United States Patent

Yamamoto

[11] Patent Number: 5,773,950
[45] Date of Patent: Jun. 30, 1998

[54] PROGRAM CREATING METHOD FOR UNIFORM-SHAPE MACHINING

[75] Inventor: Tomoyuki Yamamoto, Oshino-mura, Japan

[73] Assignee: Fanuc Ltd., Yamanashi, Japan

[21] Appl. No.: 307,662

[22] PCT Filed: Jan. 18, 1994

[86] PCT No.: PCT/JP94/00062

§ 371 Date: Sep. 22, 1994

§ 102(e) Date: Sep. 22, 1994

[87] PCT Pub. No.: WO94/17460

PCT Pub. Date: Aug. 4, 1994

[30] Foreign Application Priority Data

Jan. 29, 1993 [JP] Japan ................................ 5-032406

[51] Int. Cl.⁶ .......................... G06F 15/00; G05B 19/403
[52] U.S. Cl. .............................. 318/568.19; 318/568.23; 318/568.1; 364/474.29; 364/474.36
[58] Field of Search ..................... 364/474.28, 474.29, 364/474.35, 474.36; 318/568.23, 573, 568.19, 568.25, 568.24, 568.11, 568.15, 568.1

[56] References Cited

U.S. PATENT DOCUMENTS

| 4,384,333 | 5/1983 | Maecker ............................ 364/474 |
|---|---|---|
| 4,423,481 | 12/1983 | Reid-Green et al. .................... 364/474 |
| 4,736,325 | 4/1988 | Nagae et al. ............................. 364/474 |
| 5,216,344 | 6/1993 | Sasaki et al. ............................ 318/573 |

FOREIGN PATENT DOCUMENTS

| 59-167712 | 9/1984 | Japan . |
| 62-79504 | 4/1987 | Japan . |
| 4-165405 | 6/1992 | Japan . |

*Primary Examiner*—John W. Cabeca
*Attorney, Agent, or Firm*—Staas & Halsey

[57] ABSTRACT

A machining program for machining a workpiece into predetermined shape in a specific machining positions of the workpiece is created in advance. The position of the center of rotation and a rotation plane are specified so that a point representing the machining shape in the specific machining positions is rotationally shifted to another machining position, and a three-dimensional coordinate system is obtained based on the specified rotation center position and rotation plane. Then, a transform matrix is obtained for the cases in which the point representing the machining shape in the specific machining position defined by the obtained coordinate system is shifted for a shift angle manually inputted through a control panel. Subsequently, machining data of the machining program for the specific machining position are converted into a machining data for the shifted machining position by means of the obtained transform matrix, obtaining new machining programs for those positions are obtained.

10 Claims, 3 Drawing Sheets

PROGRAM CREATING METHOD FOR UNIFORM-SHAPE MACHINING

FIELD OF THE INVENTION

The present invention relates to a method for creating a program for machining by a machine tool, robot, etc., and more particularly, to a machining program creating method for uniform-shape machining at a plurality of positions on the circumference of one circle around a certain position.

DESCRIPTION OF THE RELATED ART

In a method of effecting uniform-shape machining at a plurality of positions by a CNC machine tool, robot, etc., a specific machining program for machining to one shape at one position is shifted to another position, whereby a machining program for uniform-shape machining for the shifted position is obtained. This method is executed by utilizing a parallel shift function and parallel rotational shift function which are provided for a CNC device or robot control device of a control system for the machine tool.

Out of these functions, the parallel shift function is used to obtain a new machining program by causing position data in the machining program to move parallel, while the parallel rotational shift function is used to obtain the new machining program by causing the position data in the program to move parallel and also to rotate. In either of these methods, specifying of the conversion quantity would require setting or teaching of an optional representative point for the machining shape.

More specifically, according to the method based on the parallel shift function, the position of an optional point on the machining shape before the movement is taught as a representative point by a teaching device; the direction and extent of the parallel movement for the machining shape is also taught by teaching the position of destination, and all the position data in the machining program are moved parallel for the set extent in the set direction.

According to the method based on the parallel rotational shift function, on the other hand, the direction of movement, extent of movement, and extent of rotation can be taught by teaching the positions of six points in total, including three optional points on the machining shape before the movement and three corresponding points after the movement, and the new machining program for new shape is obtained by causing all the position data in the program to move parallel and rotate.

Moreover, the parallel shift function may provide a method in which the conversion quantity is set numerically, besides the aforesaid method in which one point before the movement and another point after the movement, two points in total, are taught. According to this method, extents of movement in the X-, Y-, Z-axis directions are set numerically, and the new machining program effected by parallel movement is obtained by moving all the position data in the program for those extents of movement.

For example, if there are a plurality of positions for uniform-shape machining on the circumference of one circle, as in the case of machining holes in tire wheels of an automobile, the operating efficiency can be improved, where a machining program for one optional position is first prepared, and the machining programs for the rest of machining positions are created by shifting the machining positions of the first prepared program by predetermined distances respectively.

As mentioned before, however, the conventionally available program shift functions are only the parallel shift and parallel rotational shift functions. According to the example described above, moreover, the conversion involves rotational movement, so that the parallel shift function is not applicable, that is, only the parallel rotational shift function can be utilized. However, this parallel rotational shift function is not provided with a function for numerically setting the converted extent of movement. As mentioned before, therefore, this method can only be employed by setting the three points before the movement and setting the three points after the movement. Thus, if there are so many positions for machining that the frequency of shifting is increased, the number of points to be set increases in proportion, thereby adding to the complexity of the operation.

SUMMARY OF THE INVENTION

The object of the present invention is to provide a method for easily creating a machining program for the second machining position by rotationally shifting the program for the first machining position by a specified angle toward the second machining position, in effecting uniform-shape machining in a plurality of positions on the circumference of one circle.

In order to achieve the above object, a first aspect of the present invention, which is for creating machining programs to carry out uniform-shape machining in two or more machining positions on the circumference of one circle on a workpiece, comprises steps of: creating the machining programs for machining the workpiece into predetermined shapes in specific machining positions on the workpiece; specifying a rotational shift angle, rotation center position, and rotation plane so that points representing the machining shapes in the specific machining positions can be made to coincide individually with points representing the machining shapes in other machining positions on the workpiece by being rotationally shifted, and obtaining a three-dimensional coordinate system in accordance with the specified rotation center position and rotation plane; obtaining transform matrices individually for the cases in which the points representing the machining shapes in the specific machining positions defined by the obtained coordinate system are shifted individually to the points representing of the machining shapes in other machining positions; and creating the machining programs for other individual machining positions by converting machining data of the machining programs for the specific machining positions into machining data of the other machining positions by the obtained transform matrix.

Preferably, the rotation plane is specified by first teaching the intersection of the rotation plane and a rotation axis as the first representative point, then teaching the optional points, e.g., representative points of the machining shapes, on the rotation plane individually as second and third representative points, thereby defining the rotation plane by the first, second, and third representative points. Moreover, the coordinate system with three rectangular axes has an origin at the intersection of the rotation plane and a rotation axis, a first axis in a direction connecting the intersection and the point representing of the machining shape in the specific machining position, a second axis extending at right angles to the first axis along the rotation plane, and a third axis extending in the direction of a line normal to the rotation plane at the intersection.

Further preferably, the rotational shift angle is specified by combining a unit shift angle with a shift frequency, and if necessary, with a rotational shift direction.

Moreover, a second aspect of the present invention, which is for creating machining programs to carry out uniform-shape machining in two or more machining positions on the circumference of one circle on a workpiece, comprises steps of: creating the machining programs to carry out the machining for the predetermined machining shapes in specific machining positions on the workpiece; setting one of three rectangular axes of the coordinate system of a robot control apparatus parallel to the direction of a line normal to a rotation plane so that points representing the machining shapes in the specific machining positions can be made to coincide individually with points representing the machining shapes in other machining positions on the workpiece by rotationally shifting the representative points by a predetermined angle on the rotation plane with respect to a certain rotation axis; setting a coordinate system with three rectangular axes so that one axis thereof is in line with the direction of the line normal to the rotation plane, and the remaining two axes define the rotation plane; individually entering the position of the center of rotation of the rotation plane and the angle for the rotational shift in the control apparatus; calculating transform matrices individually for the cases in which the points representing the machining shapes in the specific machining positions defined by the set coordinate system are shifted individually to the points representing the machining shapes in the other machining positions; and creating the machining programs for other individual machining positions by converting machining data of the machining programs for the specific machining positions into machining data of other machining positions by the transform matrix.

Preferably, the directions of the axes of the coordinate system with three rectangular axes are set parallel to the directions of the axes of the control coordinate system of the robot control apparatus, individually.

As described above, a new machining program for another machining position on the same circumference of the same circle can easily be created from one machining program which has been created for one machining position, by simply manually inputting the position of rotation center of the rotation surface and the angle of rotation.

DESCRIPTION OF THE PREFERRED EMBODIMENT

Figure 1:
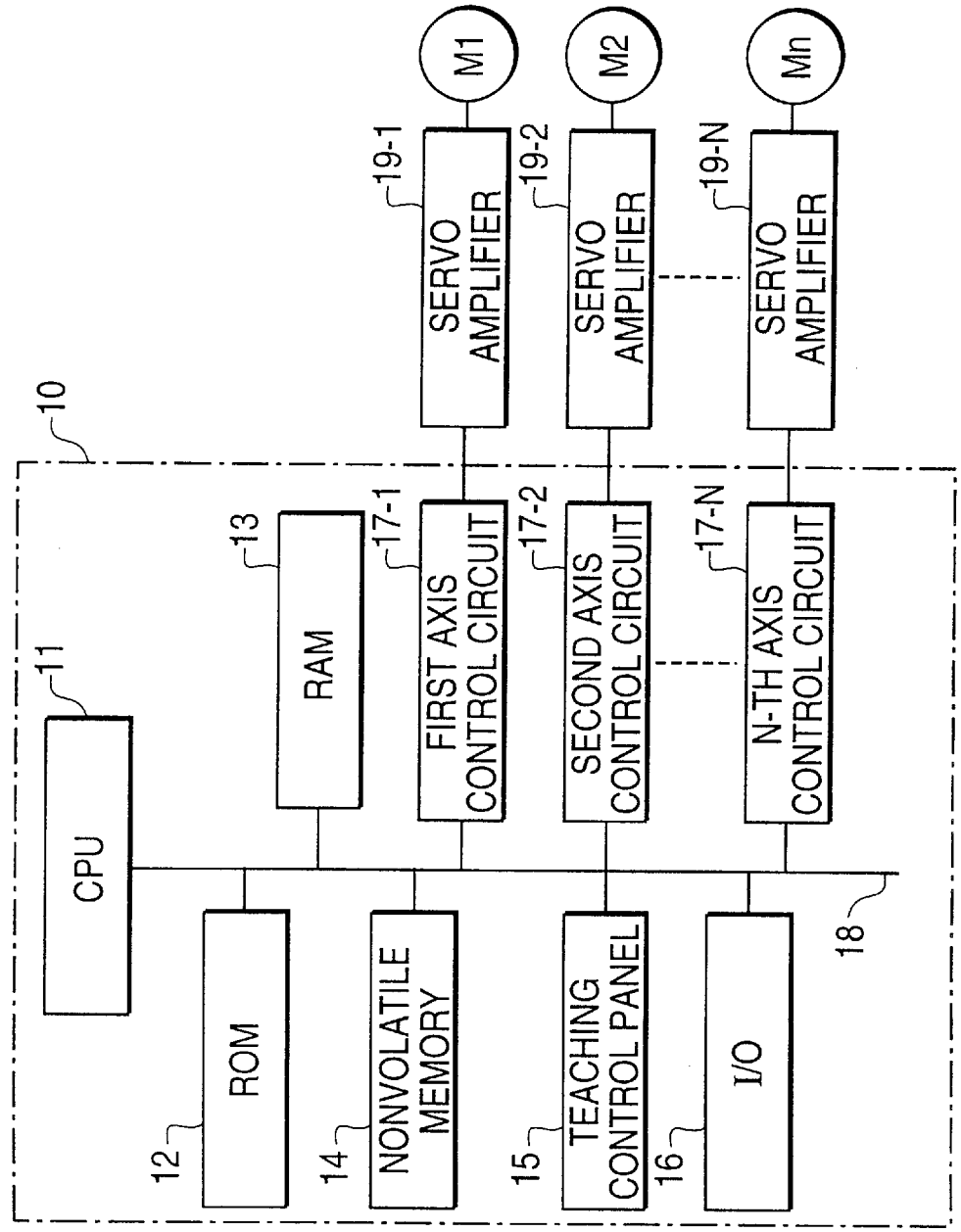
FIG. 1 is a block diagram of a robot control system according to one embodiment for carrying out a method of the present invention.

FIG. 1 is a block diagram showing the principal part of a robot drive control apparatus according to one embodiment for carrying out a method of the present invention.

The robot control apparatus 10 comprises a processor (CPU) 11 for executing robot control, a ROM 12 loaded with a control program, a RAM 13 utilized for temporary storage of data for arithmetic processing and the like, a teaching control panel 15 with a display unit, a nonvolatile memory 14 adapted to be loaded with a machining program taught by operating the teaching control panel 15 or the like or a machining program inputted through an input/output interface 16, the input/output interface 16, and first to N-th axis control circuits 17-1 to 17-N for controlling servomotors for individual axes of a robot. These elements 12 to 16 and 17-1 to 17-N are connected to the processor 11 by a bus 8. Also, the individual axis servomotors M1 to Mn are operatively controlled by the individual axis control circuits 17-1 to 17-N through the servo amplifiers 19-1 to 19-N, respectively.

The above-described arrangement is the same as or differs little from that of a conventional robot drive control apparatus, and thus a detailed description thereof will be omitted.

The machining program to which the present invention is applicable is one designed for carrying out uniform machining at a plurality of machining positions on the circumference of one circle, such as one designed to perforate the tire wheels of an automobile, more particularly to such a machining program, whereby a representative point of a machining shape of a workpiece at a specific machining position is shifted for a predetermined angle around a certain center of rotation on a predetermined plane (hereinafter referred to as a rotation plane) so that this point can be set to coincide with a representative point of a machining shape in another machining position of the workpiece.

The following is a description of the operation of the one embodiment in the case where the present invention is applied to the machining by the robot.

Figure 2:
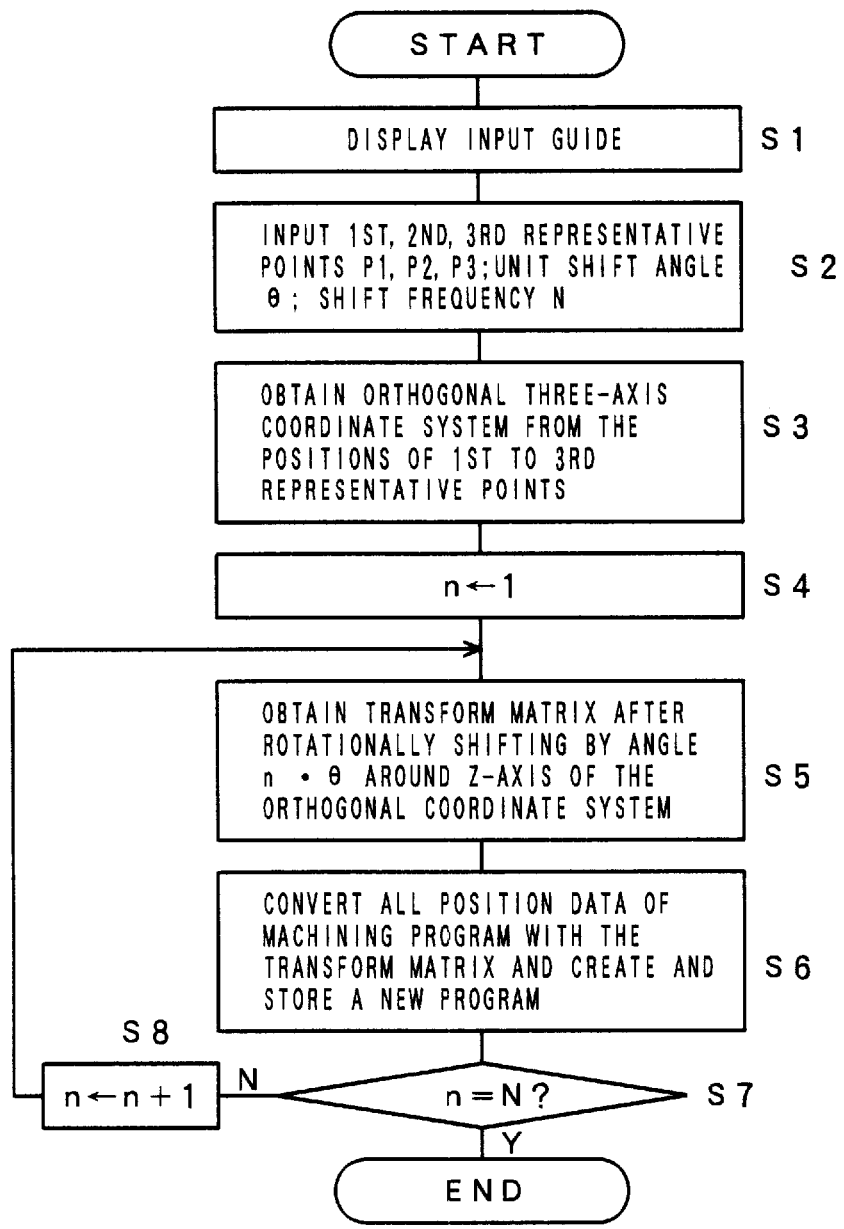
FIG. 2 is a flow chart showing a program shift processing used to create a machining program according to the embodiment.

First, before the processor 11 starts a processing shown in the flow chart of FIG. 2, a machining program according to which the workpiece is worked into a predetermined shape for one machining position is taught to the robot by the teaching control panel 15 or created in an off-line mode or the like, and the created machining program is loaded into the nonvolatile memory 14.

Figure 3:
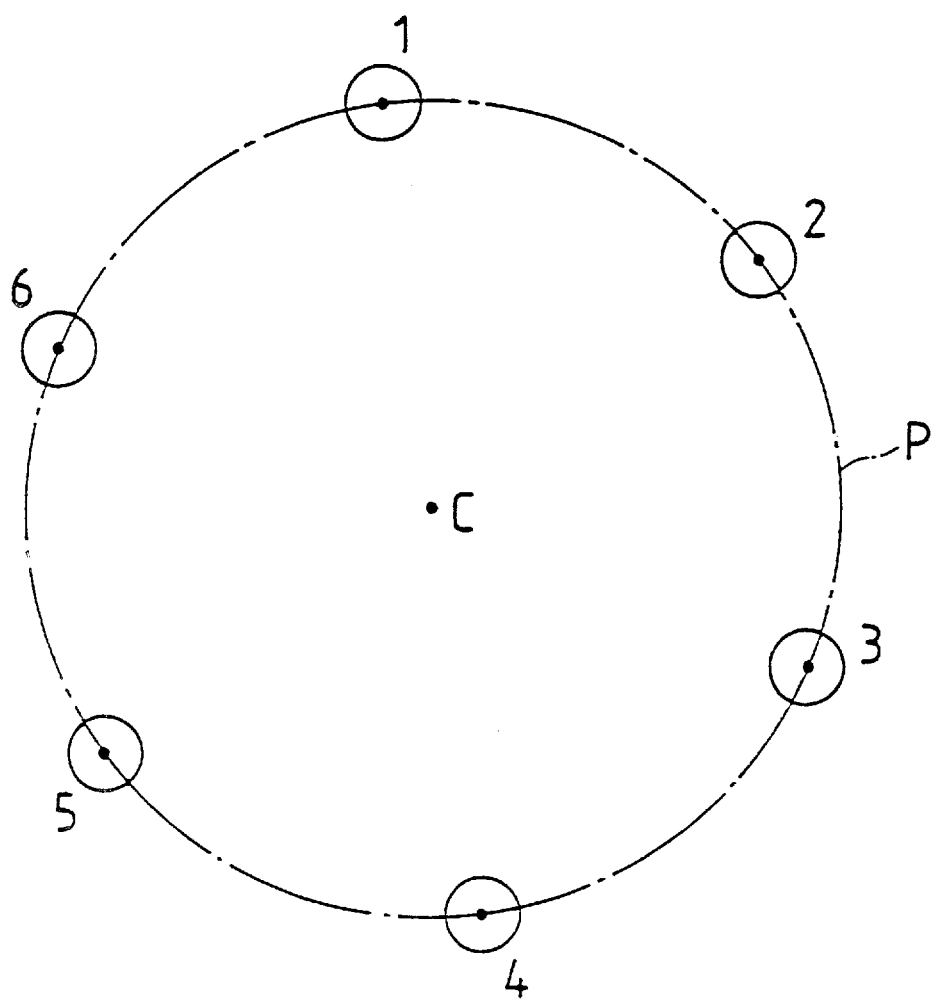
FIG. 3 is a diagram for schematically illustrating an example of the machining program created by the method of the present invention.

The following is a description of a case in which six holes 1 to 6 are formed at intervals of 60° on the circumference of one circle centering on a point C by machining, as shown in FIG. 3. The respective representative positions of the holes 1 to 6 (e.g., center of the holes) are located on one plane (drawing plane of FIG. 3), that is, one rotation plane centering on the point C as an axis of rotation. A program PRG1 for working the hole 1 is already created.

When a program shift command is then inputted by the teaching control panel 15, the processor 11 starts the processing shown in the flow chart of FIG. 2.

First, a display device attached to the teaching control panel 15 displays an input guide message demanding entry of first, second, and third representative points P1, P2 and P3, unit shift angle θ, and shift frequency N (Step S1). Thereupon, an operator teaches the intersection of the rotation plane and the rotation axis as the first representative point P1, and optional points on the rotation plane individually as the second and third representative points P2 and P3, by a teaching device for the robot. However, the position of the point P3 is selected so that it is situated in the rotational shift direction as viewed from a line connecting the points P1 and P2.

In the case of FIG. 3, the center point C is taught as the point P1, the center of the hole 1 as the point P2, and the center of another hole 2 as the point P2. Sixty degrees and 5 are inputted as the unit shift angle θ and the shift frequency, respectively.

When manual entries of the first to third representative point positions P1 to P3, unit shift angle θ, and shift frequency N are finished, the CPU reads these input data (Step S2), and obtains a rectangular three-dimensional coordinate system in accordance with the first to third representative point positions P1 to P3 (Step S3). In this coordinate system, the coordinate origin is on the point P1; the X-axis is given by the line connecting the points P1 and P2, and the XY-plane is given by a plane (rotation plane) defined by the points P1, P2 and P3. A line normal to this plane at the point P1 is aligned with the Z-axis. Thus, a machining program having a representative point of machining shape located in a certain position on the X-axis executes the processing for sequentially shifting the representative point by rotating it clockwise around the Z-axis on the X-Y plane by an angle θ at a time.

In the case of FIG. 3, the XY-plane is given by the plane on which the representative points of the holes 1 to 6 are located individually, the coordinate origin by the position of the center C, the X-axis by the line connecting the origin (center C) and the representative point of the hole 1, and the Z-axis by the line normal to the XY-plane at the center C. In this case, therefore, this XY-plane forms the rotation plane whose rotation axis serves as the Z-axis.

Then, an index n indicative of the shift frequency is set to "1" (Step S4), and a transform matrix is obtained for the case in which the representative machining shape point on the X-axis is shifted by rotation around the Z-axis of the aforesaid coordinate system for a value (n·θ) obtained by multiplying the set unit shift angle θ by the index n (Step S5).

In this case, if the coordinates of a point reached by shifting a point (x, y, z) by rotating it for the angle nθ around the origin on the XY-plane are (x', y', z'), the relationships between the X and Y values may be given by a first-order transform matrix as follows:

$$\begin{pmatrix} x' \\ y' \\ z' \end{pmatrix} = \begin{pmatrix} \cos n\theta' & -\sin n\theta & 0 \\ \sin n\theta & \cos n\theta & 0 \\ 0 & 0 & 1 \end{pmatrix} \begin{pmatrix} x \\ y \\ z \end{pmatrix}$$

(but, z=z' is given since the Z value is not changed).

Thus, a new machining program is created by converting all the position data of the machining program previously created in accordance with the transform matrix obtained from the set values of n and θ, and it is loaded into the nonvolatile memory 14 (Step S6).

If nθ=1θ is obtained in the processing of Step S5, in the case of FIG. 3, the machining program PRG1 for the hole 1 is converted into a machining program PRG2 for the hole 2 in the subsequent processing of Step S6.

Then, it is determined whether or not the index n is equal to the set shift frequency N (Step S7). If N is not reached by n yet, the index n is incremented by 1 (Step S8), and the processing of Step S5 and the subsequent processes are repeatedly executed, whereupon new machining programs are created and stored in succession. When the set shift frequency N is reached by the index n, this program shift processing terminates.

Although the three representative points P1, P2 and P3 are taught by the teaching device according to the embodiment described above, the coordinate values (x, y, z) for the individual points may be inputted instead.

Furthermore, if it is previously given that the rotation axis (Z-axis) of the rotation plane is parallel to the Z-axis of the robot control coordinate system, the operation of the foregoing embodiment for defining the XY-plane (operation to define the XY-plane on the bases of the three points by teaching the points P2 and P3, besides the point P1) can be omitted. In this case, only the rotation center position P1 of the rotation plane, unit shift angle θ and shift frequency N need to be inputted referring to the display device of the teaching control panel 15 after setting the X- and Y-axes of the rotation plane parallel to the X- and Y-axes of the robot control coordinate system, and the aforesaid entries for the points P2 and P3 are not necessary.

According to the foregoing embodiment, moreover, the rotating direction is fixed, and the rotation is set to be made in the same direction as many times as the set shift frequency N. Alternatively, however, any of the rotating directions (clockwise and counterclockwise) may be specified so that the machining programs for other positions can be obtained. In this case, the setting in Step S2 is executed in a manner such that it is repeated N' times in the positive direction and N" times in the negative direction. With respect to the positive direction, the processes of Steps S4 to S8 are executed in the same manner as in the present embodiment. If it is concluded in Step S7 that the index n is equal to N', the index n is set to "1" again, and the processes of Steps S5 to S8 are executed. The rotating direction, however, is reversed in Step S5, and "n=N"!" is determined in Step S7.

Although the case of the application to the machining by means of the robot has been illustrated in connection with the embodiment described above, the program shift of the present invention may also be utilized for NC machine tools and the like.

I claim:

1. A method for creating machining programs controlling uniform-shape machining of a machining shape in at least two machining positions on a circumference of one circle on a workpiece, said method comprising the steps of:

creating the machining programs for controlling the machining for the machining shape in specific machining positions on the workpiece;

specifying a rotational shift angle, rotation center position and rotation plane enabling points representing the machining shape in said specific machining position to coincide with corresponding points representing the machining shape on said workpiece in another machining position, and determination of a three-dimensional coordinate system based on a specified rotational center positions and rotation plane;

obtaining transform matrices individually for cases in which the points representing the machining shapes in said specific machining positions defined by said obtained coordinate system are shifted individually to the points representing the machining shapes in the other machining positions; and creating the machining programs for the individual machining positions by converting machining data of the machining programs for said specific machining positions into machining data of other machining positions by said obtained transform matrix.

2. A method for creating machining programs according to claim 1, wherein said three-dimensional coordinate system obtained in accordance with the specified rotation center position and rotation plane is a three-dimensional coordinate system with three rectangular axes, said rotation plane being defined by first and second axes, and a third axis being coincident with a line normal to said rotation plane at the rotation center position.

3. A method for creating machining programs according to claim 1, wherein said rotation plane is specified by first teaching an intersection of said rotation plane and a rotation axis as a first representative point, then teaching optional points on the rotation plane individually as second and third representative points, and defining the rotation plane by the first, second, and third representative points.

4. A method for creating machining programs according to claim 3, wherein said second representative point is a point representing a machining shape in a specific machining position in a created machining program.

5. A method for creating machining programs according to claim 3., wherein said second representative point is a point representing a machining shape in a specific machining position in a created machining program, and said third representative point is a point representing a machining shape in another machining position adjacent to said specific machining position.

6. A method for creating machining programs according to claim 1, wherein said rotation plane is specified by being defined by three different points, that is, the intersection of said rotation plane and a rotation axis, a point representing a machining shape in a specific machining position in a created machining program, and an optional point on the rotation plane, while a coordinate system with three rectangular axes is set by the intersection of said rotation plane and a rotation axis, as the origin, a first axis in a direction connecting the intersection and the point representing the machining shape in said specific machining position, a second axis extending at right angles to said first axis along the rotation plane, and a third axis extending in the direction of a line normal to said rotation plane at said intersection.

7. A method for creating machining programs according to claim 1, wherein said rotational shift angle is specified by combining a unit shift angle and a shift frequency.

8. A method for creating machining programs according to claim 1, wherein said rotational shift angle is specified by combining a unit shift angle, a shift frequency, and a rotational shift direction.

9. A method for creating machining programs controlling uniform-shape machining of a machining shape in at least two machining positions on a circumference of one circle on a workpiece, said method comprising the steps of:

creating the machining programs for controlling machining for the machining shape in specific machining positions on the workpiece;

setting one of three orthogonal axes comprising a first coordinate system of a robot control apparatus parallel to a direction of a normal of a rotation plane, on which a point representing the machining shape in a specific machining position is shifted to coincide with another point representing the machining shape on the workpiece in another machining position by being rotated around a center of rotation on the rotation plane by a predetermined angle;

setting a second coordinate system with three rectangular axes such that one axis thereof is in line with a direction of a line normal to said rotation plane and other two axes define said rotation plane;

individually inputting a position of the center of rotation of said rotation plane and the angle for the rotational shift to the robot control apparatus;

calculating transform matrices individually for cases in which points representing the machining shape in said specific machining positions defined by said second coordinate system are shifted individually to the points representing the machining shape in other machining positions; and creating the machining programs for individual machining positions by converting machining data of the machining programs for said specific machining positions into machining data for the other machining positions by said transform matrix.

10. A method for creating machining programs according to claim 9, wherein the directions of the axes of said coordinate system with three rectangular axes are parallel to the directions of the axes of the control coordinate system of the robot control apparatus, individually.

* * * * *